(12) United States Patent
Huang et al.

(10) Patent No.: US 10,510,377 B2
(45) Date of Patent: Dec. 17, 2019

(54) SYSTEM AND METHOD FOR COMBINING LIGHT CODE AND VIDEO

(71) Applicant: Industrial Technology Research Institute, Hsinchu (TW)

(72) Inventors: Po-Yu Huang, Hsinchu (TW); Xin-Lan Liao, Hsinchu (TW); Lih-Guong Jang, Hsinchu (TW); Kun-Hsien Lin, Hsinchu (TW); Chi-Neng Liu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 84 days.

(21) Appl. No.: 15/796,082

(22) Filed: Oct. 27, 2017

(65) Prior Publication Data

US 2019/0080720 A1    Mar. 14, 2019

(30) Foreign Application Priority Data

Sep. 14, 2017  (TW) .............................. 106131576 A

(51) Int. Cl.
   *G11B 27/036*   (2006.01)
   *G11B 27/30*    (2006.01)
   *G06F 16/78*    (2019.01)

(52) U.S. Cl.
   CPC ........ *G11B 27/036* (2013.01); *G06F 16/7867* (2019.01); *G11B 27/3081* (2013.01)

(58) Field of Classification Search
   CPC .......................... G11B 27/036; G06F 16/7867
   See application file for complete search history.

(56) References Cited

U.S. PATENT DOCUMENTS 5,293,385 A    3/1994  Hary
6,131,086 A    10/2000 Walker et al.
(Continued)

FOREIGN PATENT DOCUMENTS

CN    106605377 A    4/2017
TW    201227531 A    7/2012

OTHER PUBLICATIONS

Mametani, T., "Renesas Solutions for Wireless Sensor Networks—Part 4: Visible Light communication (VLC)," Retrieved from the Internet <https://www.renesas.com/en-hq/about/web-magazine/edge/solution/10-visible-light-communication.html> (Aug. 2017).
(Continued)

*Primary Examiner* — Thai Q Tran
*Assistant Examiner* — Girumsew Wendmagegn
(74) *Attorney, Agent, or Firm* — Mintz Levin Cohn Ferris Glovsky and Popeo, P.C.; Peter F. Corless; Steven M. Jensen

(57) ABSTRACT

A system and method for combining light codes and a video are provided. The system includes an editing device and a storage device. The editing device identifies the content of a video to obtain a playback period of a plurality of frames having at least one candidate object in the video. The storage device stores at least one candidate object code and at least one light code symbol, and the light code symbol has a correspondence with the candidate object code. The editing device matches playback period of the frames having the at least one candidate object with the light code symbol, so as to provide a light code output table corresponding to the video.

19 Claims, 5 Drawing Sheets

(56) References Cited

U.S. PATENT DOCUMENTS

| | | |
|---|---|---|
| 8,681,949 B1 | 3/2014 | Witten |
| 2009/0172765 A1 | 7/2009 | Kim |
| 2010/0325667 A1 | 12/2010 | Lee et al. |
| 2014/0101188 A1 | 4/2014 | Lin et al. |
| 2015/0022235 A1 | 1/2015 | Uchiki et al. |
| 2017/0289643 A1* | 10/2017 | Kachkova .......... H04N 21/4312 |

OTHER PUBLICATIONS

Sato, S. et al., "Visible Light Communication Systems Using Blue Color Difference Modulation for Digital Signage," 27th IEEE International Symposium on Personal, Indoor, and Mobile Radio Communications—(PIMRC): Fundamentals and PHY, Sep. 4-8, 2016, pp. 1-6.

M. Izz et al., "Uber-in-Light: Unobtrusive Visible Light Communication Leveraging Complementary Color Channel," IEEEE INFOCOM 2016—35th International Conference on Computer Communications, Apr. 10-14, 2016, pp. 1-9.

M. Mehrabi and S. Lafond, "Frame Synchronization of Live Video Streams Using Visible Light Communication," 2015 IEEEE International Symposium on Multimedia, Dec. 14-16, 2015, pp. 128-131.

\* cited by examiner

000# SYSTEM AND METHOD FOR COMBINING LIGHT CODE AND VIDEO

CROSS-REFERENCE TO RELATED APPLICATION

The present disclosure is based on, and claims priority from, Taiwan Application Number 106131576, filed Sep. 14, 2017, the disclosure of which is hereby incorporated by reference herein in its entirety.

BACKGROUND

1. Technical Field

The present disclosure relates to systems and methods for combining light codes and a video, and, more particularly, to a system and method for combining light codes and candidate objects in a video.

2. Description of Related Art

As the data flow of the mobile network grows with the increased adoption of wireless communications devices, it is expected that there will be 8.2 billion handheld or personal mobile devices with up to 3.2 billion Internet-connected devices by 2020. As a result, many 5G experiments in high-frequency bands have been conducted in the wireless communications industry, and optical communication is becoming the focus of this trend.

However, when a viewer sees an interesting product shown in a video on a program, news, an advertisement, or the like shown on a conventional display device (screen), the viewer (consumer) cannot get the details of the item directly from the program, such as the name, the address, meal information etc. of a gourmet restaurant or hotel that appeared in a food or leisure program. In another instance, when a viewer sees an interesting product shown in a video or on a screen shown in a shopping center, a supermarket, an exhibition center, a store etc., the viewer (consumer) cannot get the details of the item directly from the program, and has to indirectly obtain information about the product from somewhere else.

Therefore, there is a need for a solution that allows viewers (consumers) to obtain relevant and extended information about a particular product in a video without affecting normal viewing of the video in the prior art.

SUMMARY

A system for combining light codes and a video is provided, comprising: an editing device configured for identifying a content of a video to obtain a playback period of a plurality of frames having at least one candidate object in the video; and a storage device configured for storing at least one candidate object code and at least one light code symbol, wherein the editing device matches the playback period of the plurality of frames having the at least one candidate object with the at least one light code symbol to provide a light code output table corresponding to the video.

A method for combining light codes and a video is provided, comprising: identifying, by an editing device, a content of a video to obtain a playback period of a plurality of frames having at least one candidate object in the video; and matching, by the editing device, the playback period of the plurality of frames having the at least one candidate object in the video with at least one light code symbol to provide a light code output table corresponding to the video.

DETAILED DESCRIPTION

Figure 1:
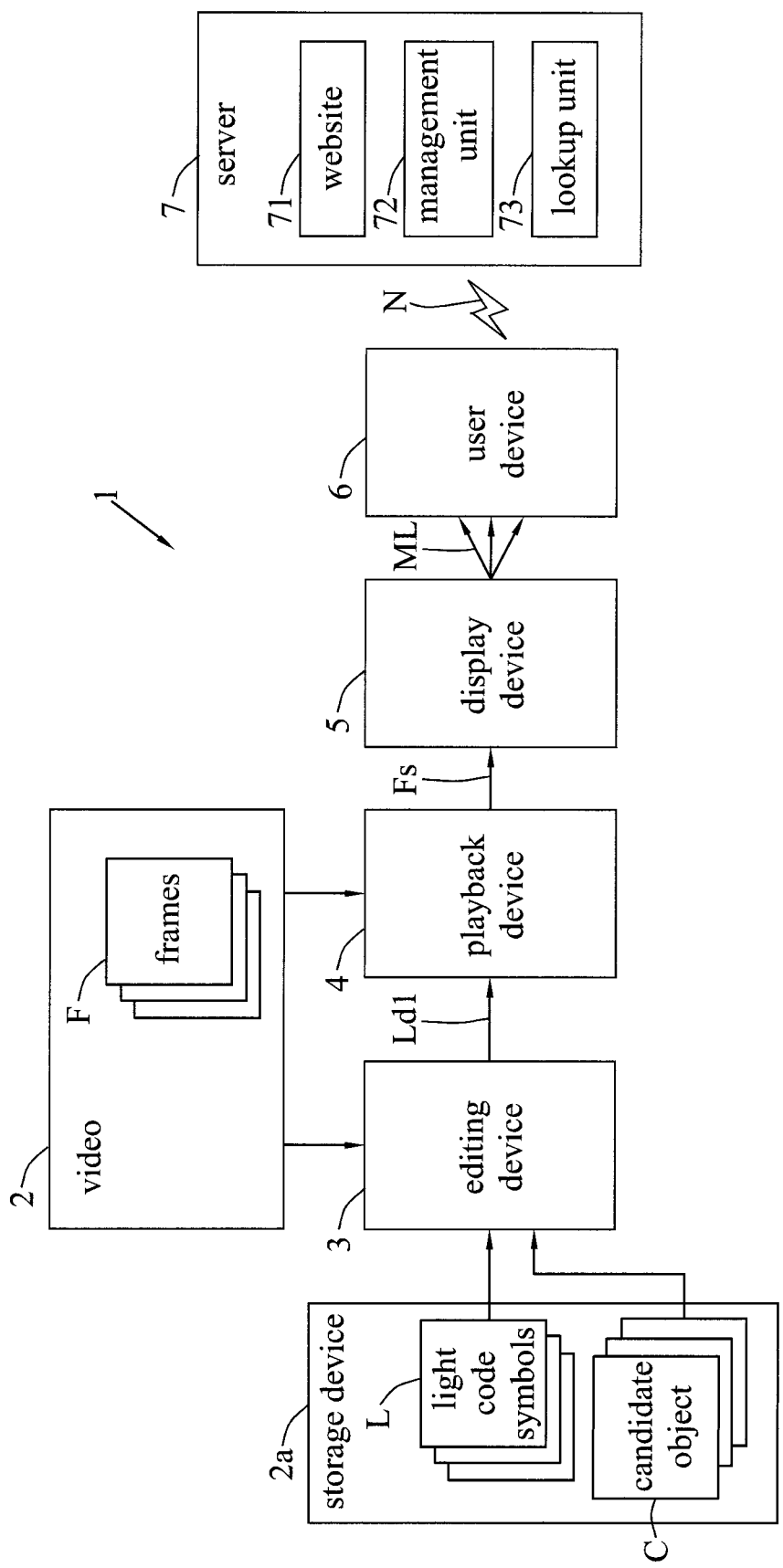
FIG. 1 is a schematic diagram depicting a system for combining light codes and a video in accordance with an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram depicting a system for combining light codes and a video 1 in accordance with an embodiment of the present disclosure.

As shown in FIG. 1, the system 1 for combining light codes and a video includes a video 2 having at least one or more candidate object frames, a storage device 2a for storing at least one or more candidate object codes C and at least one or more light code symbols L, and an editing device 3. The light code symbols L and the candidate objects C have a correspondence relationship. The candidate objects C may be, for example, product objects in the plurality of frames F displayed in the video 2. The light code symbols L may be, for example, optical camera communications (OCC) light code symbols. The storage device 2a may be, for example, a USB flash drive, a flash driver, a flash card, a hard disk or the like. The editing device 3 may be, for example, an editor (e.g., a video editor), a processor or the like. However, the present disclosure is not limited to the above.

Table 1A below shows light code symbols and object codes, wherein the light code symbols L and the object codes C have a one-to-one correspondence. For example, light code symbols 011 to 005 correspond to object codes C1 to C5, respectively. However, the order of correspondence between the light code symbols 001 to 005 and the object codes C1 to C5 is not limited to that shown. For example, the light code symbol 011 can be set to correspond to object code C2; the light code symbol 012 can be set to correspond to object code C5 and the like; and the present disclosure is not limited as such.

TABLE 1A

Light code symbol and object code table

| Light code symbol (L) | Object code (C) |
|---|---|
| 011 | C1 |
| 012 | C2 |
| 013 | C3 |
| 014 | C4 |
| 015 | C5 |
| ... | ... |

The editing device 3 identifies the content of the video 2 in order to retrieve, from the plurality of frames F of the video 2 of FIG. 1, a candidate object playback order table Ct1 shown in Table 1b below. The candidate object playback order table Ct1 includes a plurality of candidate objects C and the order in which they are played. For example, in the candidate object playback order table Ct1, candidate objects C1, C4 and C5 are played in the order mentioned.

TABLE 1B

Candidate object playback order table Ct1

| Playback order | Candidate object (C) |
|---|---|
| 1 | C1 |
| 2 | C4 |
| 3 | C5 |
| ... | ... |

Based on the light code symbols and object code table shown in FIG. 1A, the editing device 3 matches the plurality of light code symbols L with the plurality of candidate objects C in the plurality of frames in the video 2 to create a light code output table Ld1 as shown in table 1C below, such that matched light code symbols L are played dynamically in correspondence with the order (time) in which the respective object codes C are played in the plurality of frames F in the video 2.

TABLE 1C

Light code output table (Ld1)

| Playback order | Candidate object (C) | Matched light code symbol (L) |
|---|---|---|
| 1 | C1 | 011 |
| 2 | C4 | 014 |
| 3 | C5 | 015 |
| 4 | ... | ... |

A playback device 4 plays the video 2 and performs a coding operation on the plurality of light code symbols L stored in the light output code Ld1 to generate a plurality of modulation control signal Fs, such that the plurality of modulation control signal Fs and the matched candidate objects C in the plurality of frames F of the video 2 are outputted simultaneously to a display device 5. The display device 5 is used for displaying the video 2 and outputting a plurality of light codes (e.g., modulated optical signals) ML based on the plurality of modulation control signal Fs, wherein the plurality of light codes ML are associated with information of the matched candidate objects C.

As shown in FIG. 1, the system 1 for combining light codes and a video further includes a user device 6 for scanning a display picture showing a candidate object C included in the video on the display device 5 in order to retrieve a light code ML matching the candidate object C from the display device 5. The user device 6 can be, for example, a smartphone or a tablet PC, and the user device 6 can use a built-in optical camera to scan a display picture showing a candidate object C included in the video on the display device 5, but the present disclosure is not limited to this.

As shown in FIG. 1, the system 1 for combining light codes and a video further includes a server 7, which can be connected to the user device 6 via a wired or wireless network N. Based on the light code ML retrieved by the user device 6, the server 7 looks up information related to the light code ML, and returns the information related to the light code ML back to the user device 6.

Moreover, the server 7 may include or be connected to a website 71, and include a management unit 72 and a lookup unit 73. The website 71 can be, for example, a product website or an electronic business website. The management unit 72 is used for managing the product website, multimedia information or the like. The lookup unit 73 is used for looking up information related to the light code ML (e.g., product traceability information, product story information, or electronic business information) and sending the information related to the light code ML to the user device 6.

In an embodiment, the server 7 stores information associated with objects based on a light code symbol and object code table, wherein the information associated with the objects includes product traceability information, product story information, and electronic business information.

Figure 2:
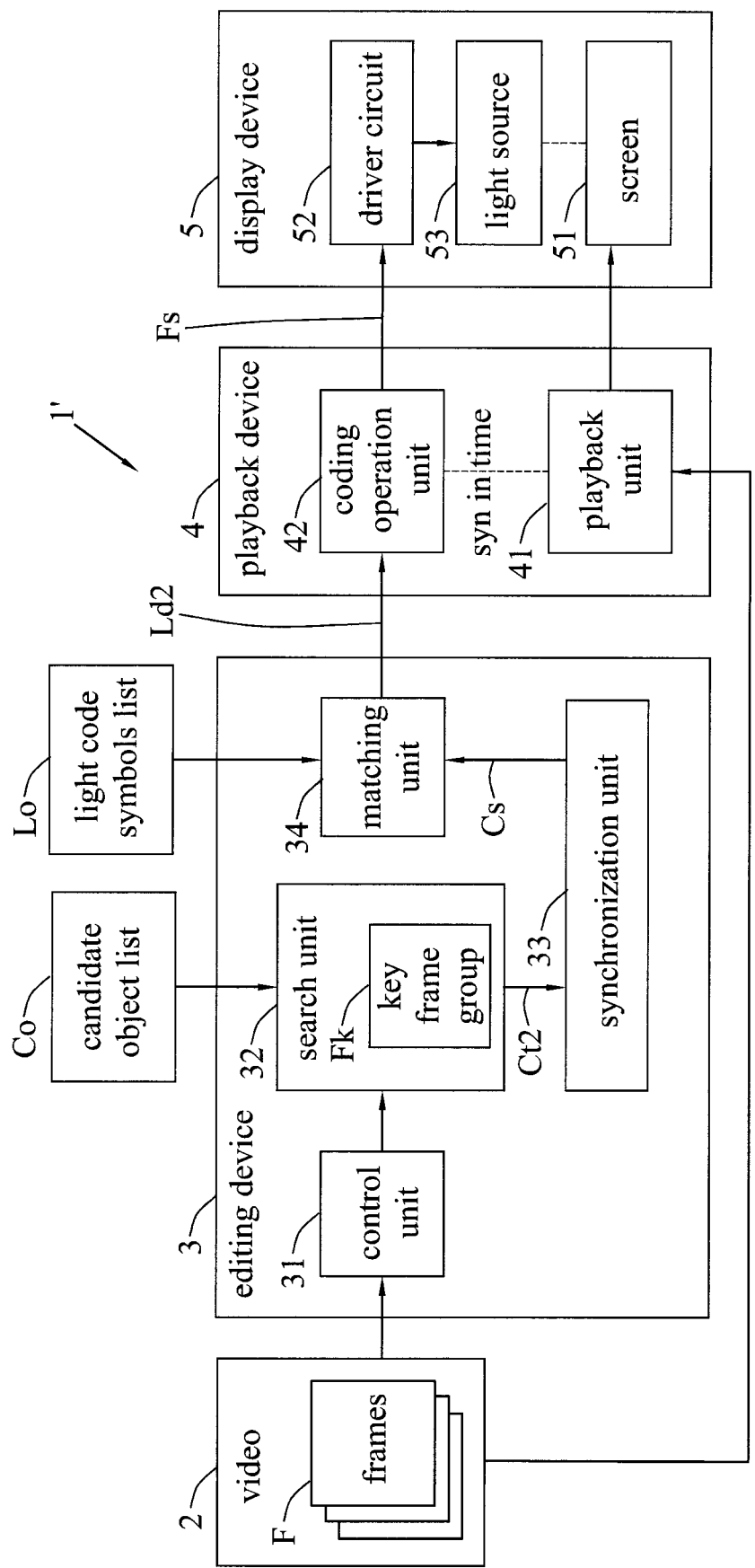
FIG. 2 is a schematic diagram depicting a system for combining light codes and a video in accordance with another embodiment of the present disclosure.

FIG. 2 is a schematic diagram depicting a system 1' for combining light codes and a video in accordance with another embodiment of the present disclosure.

In FIG. 2, the system 1' for combining light code and video may include a table of a light code symbol list Lo and a corresponding candidate object list Co shown in Table 2A below.

TABLE 2A

| Light code symbol list (Lo)<br>Light code symbol (L) | Candidate object list (Co)<br>Candidate object code (C) |
|---|---|
| 011 | C1 |
| 012 | C2 |
| 013 | C3 |
| ... | ... |

The editing device 3 determines the start and end time of frames F in which the candidate objects (e.g., pictures, symbols, numbers, or text descriptions) appear in the plurality of frames F in the video 2 based on the data in the candidate object list Co, and matches the start and end time of these frames F with the data in the light code symbol list Lo to create a light code output table Ld2.

In this embodiment, as shown in FIG. 2, the editing device 3 includes a control unit 31, a search unit 32, a synchronization unit 33 and a matching unit 34. The control unit 31 controls the frame rate of the plurality of frames F of the video 2.

The search unit 32 searches the plurality of frames F of the video 2 for candidate objects (e.g., pictures, symbols, numbers, or text descriptions) based on the candidate object codes C and determines key frame groups Fk containing these candidate objects, thus creating a candidate object and key frame group correspondence table Ct2 shown in Table 2B below. Moreover, the search unit 32 records the start and end time of the key frame groups containing each candidate object.

TABLE 2B

Candidate object and key frame group correspondence table (Ct2)

| Candidate object code (C) | Key frame group (Fk) |
|---|---|
| C1 | Fk1 ` Fk4 |
| C2 | Fk2 |
| C3 | Fk3 |
| ... | ... |

For example, the synchronization unit 33 can use the start and end time of the key frame group Fk2 containing the candidate object code C2 as the start time (e.g., T1a=00:00:05,344) and end time (e.g., T1b=00:02:05,344) for outputting the light code symbol L for the candidate object code C2, wherein the format of the time is "hour:minute:second, millisecond". Therefore, the synchronization unit 33 can synchronize the start and end time for outputting each light code symbol L with the start and end time for playing each of the key frame groups Fk containing a candidate object in the plurality of frames F of the video 2. A playback period correspondence table of candidate objects and key frame groups Cs shown in Table 2C can be created.

TABLE 2C

Playback period correspondence table of candidate objects and key frame groups (Cs)

| Candidate object in video | Key frame group (Fk) | Playback period of key frame group in video | |
|---|---|---|---|
| | | Start | End |
| C2 | Fk2 | T1a (00:00:05, 344) | T1b (00:02:05, 344) |
| C1 | Fk1 | T2a (00:04:05, 345) | T2b (00:04:09, 281) |
| C3 | Fk3 | T3a (00:04:09, 315) | T3b (00:04:11, 510) |
| C1 | Fk4 | T4a (00:04:12, 252) | T4b (00:04:15, 312) |

The matching unit 34 matches the candidate objects in the playback period correspondence table of candidate objects and key frame groups Cs with the light codes in the light code symbol list Lo to create a light code output table Ld2 as shown in Table 2D below.

TABLE 2D

Light code output table (Ld2)

| Light code symbol (L) | Candidate object in video | Output start time (i.e., playback start time of candidate object frame) | Output end time (i.e., playback end time of candidate object frame) |
|---|---|---|---|
| 012 | C2 | 00:00:05, 344 | 00:02:05, 344 |
| 011 | C1 | 00:04:05, 345 | 00:04:09, 281 |
| 013 | C3 | 00:04:09, 315 | 00:04:11, 510 |
| 011 | C1 | 00:04:12, 252 | 00:04:15, 312 |

As shown in FIG. 2, the system 1' for combining light codes and a video further includes a playback device 4 electrically connected or communicatively connected with the editing device 3. Alternatively, the playback device 4 can be electrically connected with a storage apparatus (e.g., the storage device 2a of FIG. 1), such as a USB flash drive, a flash driver, a flash card, a hard disk or the like.

In an embodiment, the storage device is a storage device storing the video 2. The light code output table Ld2 can also be stored in the storage device storing the video 2, but the present disclosure is not limited as such.

The playback device 4 may include a playback unit 41 and a coding operation unit 42. The playback unit 41 is used for playing the video 2. The coding operation unit 42 reads the data in the light code output table Ld2, generates a plurality of modulation control signals Fs corresponding to the plurality of light code symbols L in the light code output table Ld2, and outputs the modulation control signal Fs one at a time in synchronization with the time during which a corresponding key frame group in the video 2 is played by the playback unit 41. In an embodiment, the modulation control signals Fs can be, for example, frequency shift keying (FSK) modulation signals. The playback device 4 can be, for example, a player.

As shown in FIG. 2, the system 1' for combining light codes and a video includes a display device 5 electrically connected or communicatively connected with the playback device 4. The display device 5 includes a screen 51, a driver circuit 52 and a light source 53. The screen 51 displays the video 2 played by the playback unit 41. The coding operation unit 42 sends the modulation control signals Fs to the driver circuit 52. The driver circuit 52 controls the on/off of the light source 53 based on the modulation control signals Fs, including control of the brightness or flashing frequency of the light source 53, such that the display device 5 emits light codes M1 according to the candidate objects shown in the video 2. The display device 5 can be, for example, a display. The light source 53 can include, for example, light emitting diodes (LEDs) or organic light emitting diodes (OLEDs).

Figure 3:
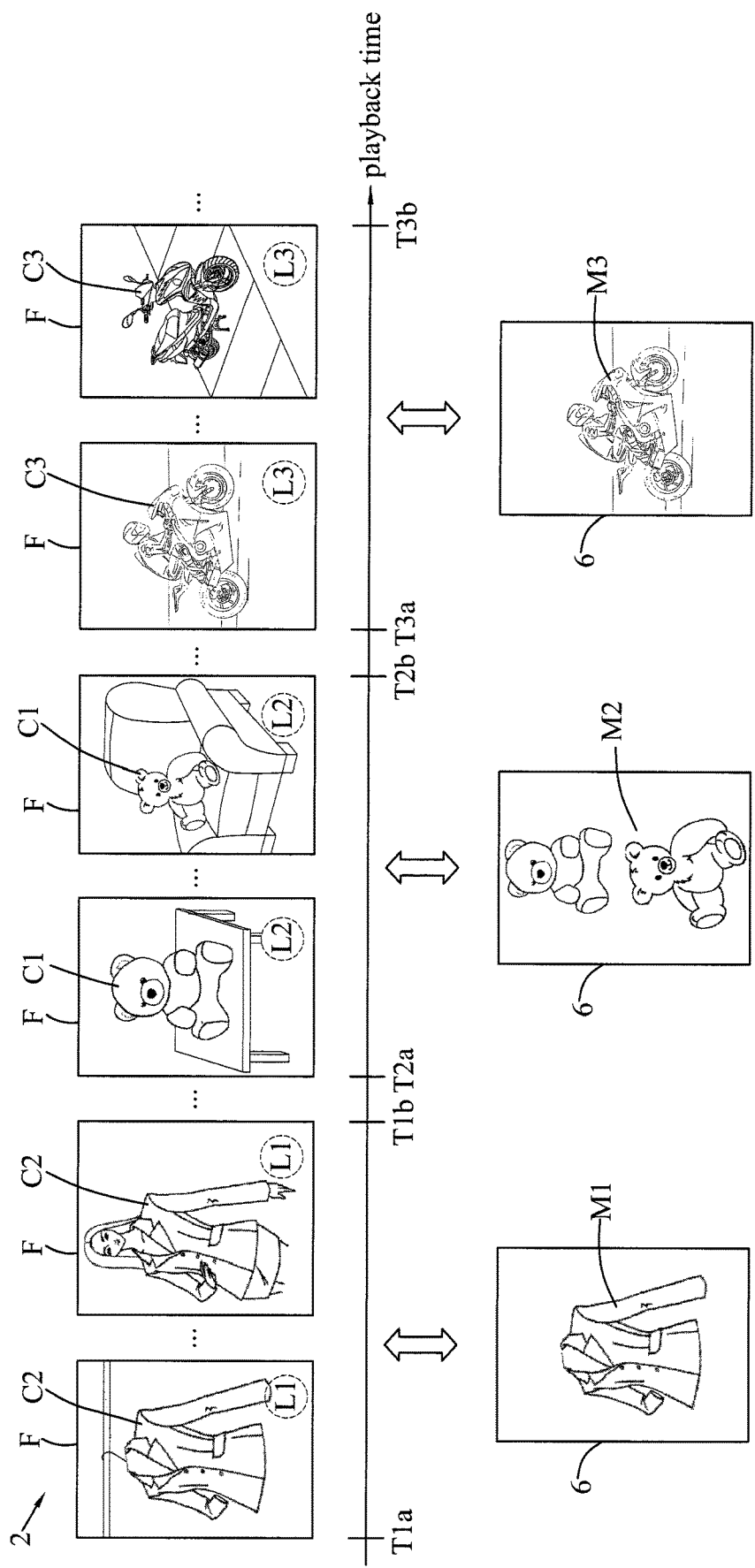
FIG. 3 is a schematic diagram depicting a user device retrieving matching light codes from a display device based on candidate objects in the video in the system for combining light codes and a video in accordance with an embodiment of the present disclosure.

FIG. 3 is a schematic diagram depicting the user device 6 scanning the display picture of the display device 5 showing the video 2 and retrieving the corresponding light codes ML in the system for combining light codes and a video 1' of FIG. 2.

As shown in FIG. 3, for example, from a playback start time T1a to a playback end time T1b in which a candidate object C2 (shown as a jacket in FIG. 3) is displayed, in other words, from output start time to output end time for a light code symbol L2 (with code 012), the user device 6 (e.g., a smartphone) can scan the display picture of the display device 5 showing the candidate object C2, and retrieve and decode from the display device 5 a signal of the light code ML (e.g., a second light code) corresponding to the candidate object C2 to obtain the corresponding light code symbol L2 (i.e., code 012), which is then used to lookup information M1 (e.g., product information, purchase information or website link for the jacket) associated with the light code symbol L2 from the server 7 via an application of the user device 6; however, the present disclosure is not limited as such.

As another example, from a playback start time T2a to a playback end time T2b in which a candidate object C3 (shown as a toy bear in FIG. 3) is displayed, in other words, from output start time to output end time for a light code symbol L1 (with code 011), the user device 6 (e.g., a smartphone) can scan the display picture of the display device 5 showing the candidate object C1, and retrieve and decode from the display device 5 a signal of the light code ML (e.g., a first light code) corresponding to the candidate object C1 to obtain the corresponding light code symbol L1 (i.e., code 011), which is then used to lookup information M2 (e.g., product information, purchase information or website link for the toy bear) associated with the light code symbol L1 from the server 7 via the application of the user device 6; and the present disclosure is not limited as such.

As yet another example, from a playback start time T3a to a playback end time T3b in which a candidate object C3 (shown as a motorcycle in FIG. 3) is displayed, in other words, from output start time to output end time for a light code symbol L3 (with code 013), the user device 6 (e.g., a smartphone) can scan the display picture of the display device 5 showing the candidate object C3, and retrieve and decode from the display device 5 a signal of the light code ML (e.g., a third light code) corresponding to the candidate object C3 to obtain the corresponding light code symbol L3 (i.e., code 013), which is then used to lookup information M1 (e.g., product information, purchase information or website link for the motorcycle) associated with the light code symbol L3 from the server 7 via the application of the user device 6; however, the present disclosure is not limited as such.

Figure 4:
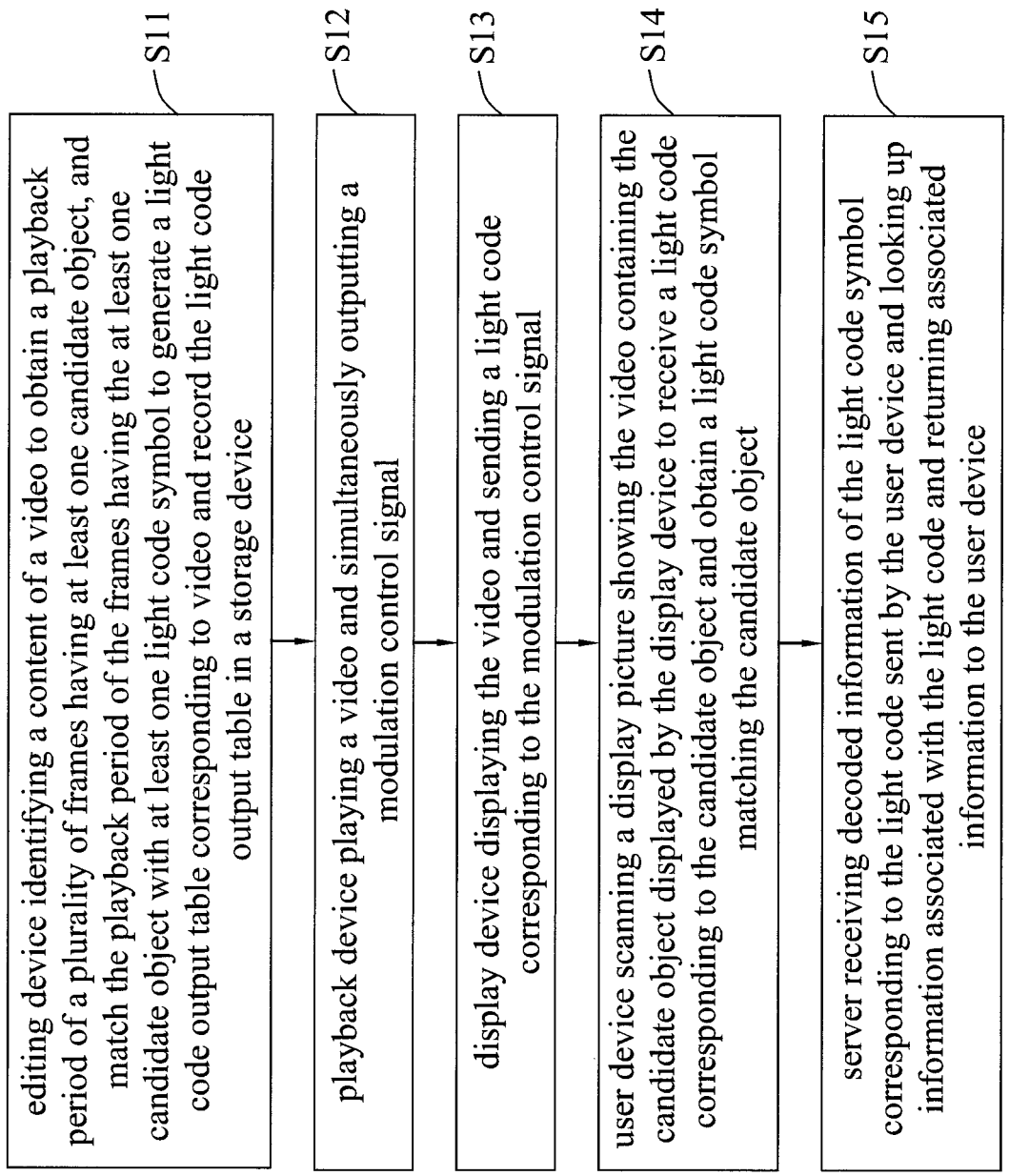
FIG. 4 is a flowchart illustrating a method for combining light codes and a video in accordance with an embodiment of the present disclosure.

FIG. 4 is a flowchart illustrating a method for combining light codes and a video in accordance with an embodiment of the present disclosure. The following descriptions are to be taken in conjunction with descriptions with respect to FIG. 1 (or FIG. 2).

In step S11 of FIG. 4, an editing device 3 (e.g., an editor) identifies content of a video 2 to obtain a playback period of at least one candidate object C in a plurality of frames F of the video 2, and matches at least one light code symbol L with the at least one candidate object C during the playback period of the at least one candidate object C to generate a light code output table Ld2 (or Ld2) corresponding to the video 2 and record the light code output table Ld in a storage device 2a.

In step S12 of FIG. 4, a playback device 4 plays the video 2 and outputs at least one modulation control signal Fs in synchronization with the video 2.

In an embodiment, a playback unit 41 of the playback device 4 plays the video 2, and a coding operation unit 42 of a playback device 4 reads the at least one light code symbol L in the light code output table Ld1 (or Ld2) to generate the corresponding modulation control signal Fs. The coding operation unit 42 outputs the modulation control signal Fs in synchronization with the playback of the at least one candidate object C in the video 2 played by the playback unit 41.

In step S13 of FIG. 4, a display device 5 displays the video 2 and outputs a light code ML corresponding to the at least one modulation control signal Fs. In other words, when a frame F of the video 2 containing the candidate object C is displayed on a screen 51 of the display device 5, the display device 5 will simultaneously output a light code ML (e.g., a modulation optical signal or modulation light beam) corresponding to the at least one modulation control signal Fs.

More particularly, the screen 51 of the display device 5 displays the video 2 played by the playback unit 41, and the coding operation unit 42 transmits the modulation control signal Fs to a (light source) driver circuit 52 of the display device 5, and the (light source) driver circuit 52 controls the time, frequency or duty ratio of on/off or flashing (e.g., the ratio of on time and off time) etc.

In step S14 of FIG. 4, a user device 6 scans the display picture containing the candidate object C displayed by the display device 5 to receive the light code ML corresponding to the candidate object C and obtains a light code symbol L matching the candidate object C. The details of how the light codes are received and how the corresponding light code symbols are obtained are found in corresponding TW patent application No. 106126391, but the present disclosure is not limited as such.

In step S15 of FIG. 4, a server 7 receives decoded information of the light code symbol L corresponding to the light code ML sent by the user device 6, and looks up information associated with the light code ML based on the decoded information and returns the information associated with the light code ML to the user device 6, but the present disclosure is not limited as such. In an embodiment, the returning of the information associated with the light code ML to the user device 6 may include the server 7 provides an trigger control, such that the user device 6 then links to a service providing website associated with the candidate object C.

Figure 5:
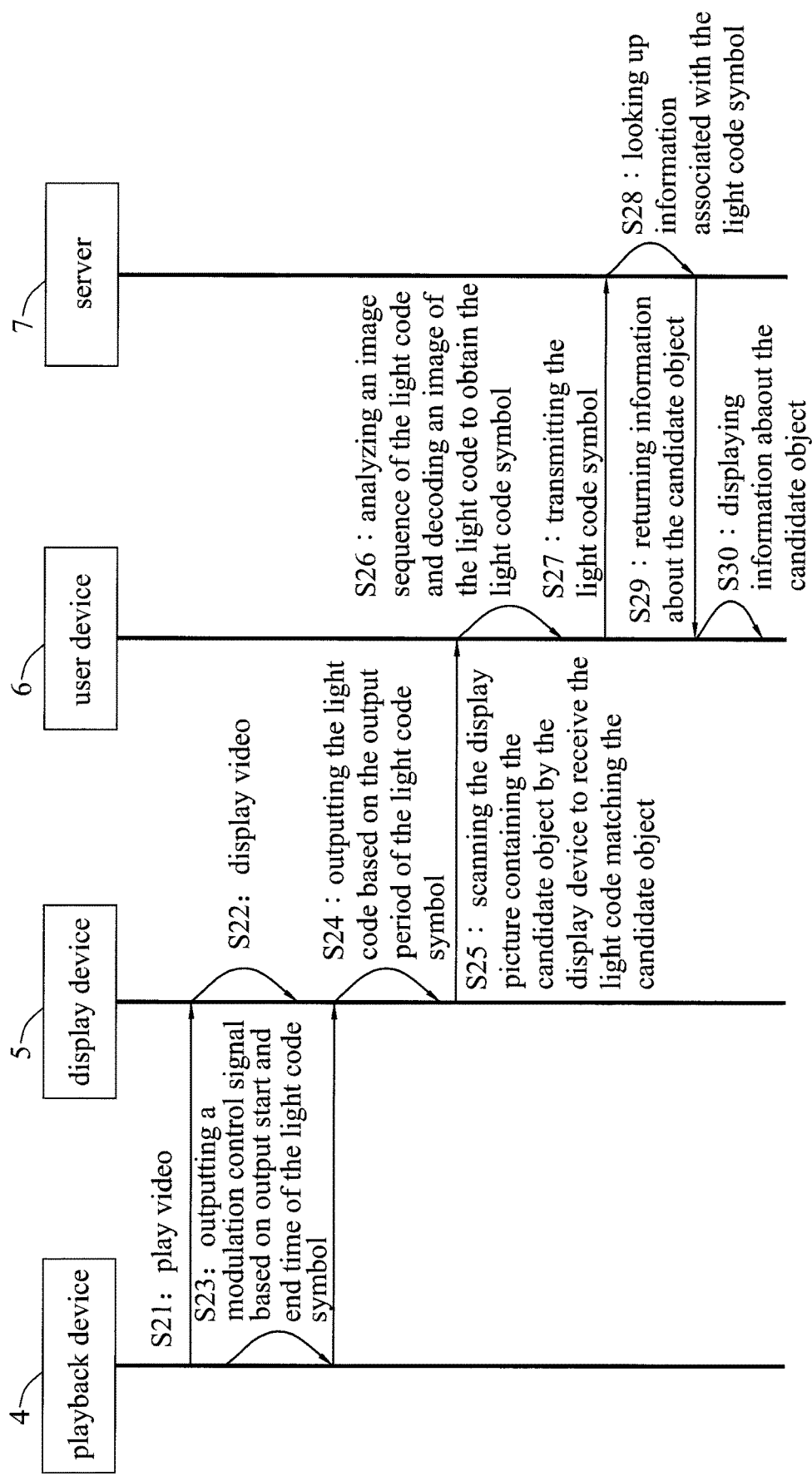
FIG. 5 is a flowchart illustrating a method for combining light codes and a video in accordance with another embodiment of the present disclosure.

FIG. 5 is a flowchart illustrating a method for combining light codes and a video in accordance with another embodiment of the present disclosure. The following descriptions are to be taken in conjunction with descriptions with respect to FIG. 1 (or FIG. 2), and the steps are the same or similar to steps S12 to S15 of FIG. 4.

In step S21 of FIG. 5, a playback device 4 plays the video 2.

In step S22 of FIG. 5, a display device 5 displays the video 2.

In step S23 of FIG. 5, the playback device 4 outputs a modulation control signal Fs corresponding to each of the light code symbols L based on an output start time and an output end time of each light code symbol L.

In step S24 of FIG. 5, the display device 5 outputs a corresponding light code ML based on the output period of the respective light code symbol L.

In step S25 of FIG. 5, a user device 6 scans a display picture (screen 51) containing the candidate object C of the video 2 displayed by the display device 5 to receive the light code ML matching the candidate object C from the display device 5. For example, a camera module in the user device 6 takes a photo of the display picture of the display device 5 to receive an image containing the light code ML.

In step S26 of FIG. 5, the user device 6 analyzes the image sequence of the light code ML and decodes the image of the light code ML to obtain the light code symbol L corresponding to the candidate object C.

In step S27 of FIG. 5, the user device 6 transmits the light code symbol L corresponding to the candidate object C obtained from decoding to the server 7.

In step S28 of FIG. 5, a server 7 looks up information associated with the light code symbol L of the corresponding candidate object C, e.g., production information, website or electronic business information of the corresponding candidate object.

In step S29 of FIG. 5, the server 7 returns information associated with the candidate object C to the user device 6.

In step S30 of FIG. 5, the user device 6 displays the information associated with the candidate object C.

In conclusion, the present disclosure matches at least one candidate object code with at least one light code symbol during a playback period of the at least one candidate object in a plurality of frames of a video to provide a light code output table corresponding to the video. A light code of the matched light code symbol is then dynamically outputted in correspondence with the playback period of the candidate object in the video, thereby allowing a viewer (consumer) to more easily and quickly obtain information associate with the candidate object shown in the video or on the screen.

Moreover, the present disclosure adopts production information application of Internet of Things (IoT), i.e., combines a candidate object with a light code, such that the consumer can intuitively associate the candidate object with the content information, allowing vendor and/or product information to be provided. It can be used at a Machine-to-Machine (M2M) entry point to collect data, and provide unique analysis on consumer's preferences and/or product values to the server. In addition, the present disclosure improves the ease of interaction of information transmission, i.e., allows consumers to obtain information about a particular product more easily, and increases exposure of the product.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for combining light codes and a video, comprising:
   an editing device configured for identifying a content of a video to obtain a playback period of a plurality of frames having at least one candidate object in the video; and
   a storage device configured for storing at least one candidate object code and at least one light code symbol,
   wherein the editing device matches the playback period of the plurality of frames having the at least one candidate object with the at least one light code symbol to provide a light code output table corresponding to the video, and
   wherein the editing device is an editor or a processor, the candidate object is a product object displayed in the video, and a light code of the light code symbol is an optical camera communication (OCC) light code.

2. The system of claim 1, wherein the editing device retrieves from the video a candidate object playback order table containing a plurality of candidate objects and an order in which the candidate objects are played.

3. The system of claim 2, wherein the editing device matches a plurality of light code symbols with the candidate objects in the video, respectively, to create the light code output table such that the matched light code symbols are dynamically output in correspondence with a playback order of the playback period of the candidate objects in the video.

4. The system of claim 1, further comprising a playback device configured for playing the video and performing a coding operation on the light code symbol contained in the light code output table to create a modulation control signal corresponding to the light code symbol.

5. The system of claim 4, further comprising a display device, wherein the playback device simultaneously outputs the modulation control signal and the frame containing the matched candidate object in the video to the display device, such that the display device outputs a light code corresponding to the modulation control signal and displays a display picture of the frame containing the matched candidate object in the video on a display picture simultaneously.

6. The system of claim 5, further comprising a user device configured for scanning the display picture of the frame containing the candidate object displayed by the display device and receiving from the display device the light code matching the candidate object.

7. The system of claim 6, further comprising a server configured for storing information associated with objects based on a light code symbol and object code table, wherein the information associated with the objects includes product traceability information, product story information, and electronic business information.

8. The system of claim 7, wherein the server searches the information associated with the objects based on the light code received by the user device for the information of the candidate object corresponding to the light code, and outputs the information of the candidate object corresponding to the light code to the user device.

9. The system of claim 1, further comprising a light code symbol and object code table including a plurality of light code symbols and a plurality of object codes corresponding to the light code symbols, wherein the object codes include pictures, symbols, numbers, or text descriptions corresponding to the object.

10. The system of claim 9, wherein the editing device includes a search unit configured for identifying the content of the video based on the plurality of object codes to obtain playback start time and playback end time of at least one key frame group containing the at least one candidate object corresponding to the object codes, and wherein the at least one key frame group includes a plurality of frames displayed sequentially, and the playback period of the at least one candidate object includes the playback start time and the playback end time of the at least one key frame group.

11. The system of claim 10, wherein the editing device includes a synchronization unit, and when the search unit obtains the key frame groups corresponding to the plurality of object codes, the synchronization unit sets the candidate object codes corresponding to the key frame groups in an order based on a playback order in which the plurality of the key frame groups are played to create a playback period correspondence table of the candidate objects and the key frame groups.

12. The system of claim 11, wherein the editing device includes a matching unit configured for determining the light code symbol corresponding to each of the candidate objects in the playback period correspondence table, so as to create the light code output table in which the output periods and output order of the light code symbols are in correspondence to the playback periods and the playback order of the key frame groups.

13. A method for combining light codes and a video, comprising:
   identifying, by an editing device, a content of a video to obtain a playback period of a plurality of frames having at least one candidate object in the video;
   matching, by the editing device, the playback period of the plurality of frames having the at least one candidate object in the video with at least one light code symbol to provide a light code output table corresponding to the video; and
   playing, by a playback device, the video and outputting a modulation control signal corresponding to the light code symbol simultaneously.

14. The method of claim 13, further comprising storing, by the editing device, the light code output table in a storage device.

15. The method of claim 13, wherein an output period in which the playback device outputs the modulation control signal is in synchronization with the playback period in which a corresponding candidate object is played in the video.

16. The method of claim 13, further comprising displaying, by a display device, the video and outputting a light code corresponding to the modulation control signal.

17. The method of claim 16, wherein when a frame containing the candidate object in the video is displayed on the display device, the display device simultaneously outputs the light code of the light code symbol corresponding to the candidate object.

18. The method of claim 17, further comprising scanning, by a user device, a display picture of the display device displaying the video containing the candidate object to receive the light code corresponding to the candidate object and obtain the light code symbol matching the candidate object.

19. The method of claim 18, further comprising receiving, by a server, decoded information corresponding to the light code symbol of the light code transmitted by the user device, and looking up and returning information associated with the light code symbol matching the candidate object to the user device.

* * * * *